US009817382B2

(12) United States Patent
Tharaldson et al.

(10) Patent No.: US 9,817,382 B2
(45) Date of Patent: Nov. 14, 2017

(54) SYSTEM AND METHODS FOR CONTROL AND MONITORING OF A FIELD DEVICE

(71) Applicant: TESCOM CORPORATION, Elk River, MN (US)

(72) Inventors: Linda R. Tharaldson, Oak Grove, MN (US); Gordon C. Muir, Maple Grove, MN (US); Jeffrey A. Wakefield, Big Lake, MN (US)

(73) Assignee: TESCOM CORPORATION, Elk River, MN (US)

( * ) Notice: Subject to any disclaimer, the term of this patent is extended or adjusted under 35 U.S.C. 154(b) by 302 days.

(21) Appl. No.: 14/291,815

(22) Filed: May 30, 2014

(65) Prior Publication Data

US 2014/0352813 A1 Dec. 4, 2014

Related U.S. Application Data

(60) Provisional application No. 61/830,545, filed on Jun. 3, 2013.

(51) Int. Cl.
*G05B 19/042* (2006.01)
*G05D 16/20* (2006.01)
*G05B 11/36* (2006.01)

(52) U.S. Cl.
CPC ..... *G05B 19/0425* (2013.01); *G05D 16/2093* (2013.01); *G05B 11/36* (2013.01);
(Continued)

(58) Field of Classification Search
CPC ................ G05B 19/0425; G05B 11/36; G05B 2219/33331; G05D 16/2093; Y10T 137/7793
See application file for complete search history.

(56) References Cited

U.S. PATENT DOCUMENTS

2002/0117214 A1* 8/2002 Tucker ............... G05D 16/2053
137/487.5
2008/0126861 A1* 5/2008 Zielinski ............ G05B 19/4185
714/25
(Continued)

FOREIGN PATENT DOCUMENTS

| EP | 2 045 673 A2 | 4/2009 |
| EP | 2 490 088 A2 | 8/2012 |
| WO | WO-98/14851 A1 | 4/1998 |

OTHER PUBLICATIONS

International Preliminary Report on Patentability and Written Opinion for corresponding International application No. PCT/US2014/040609, dated Dec. 8, 2015 (12 pages).
(Continued)

*Primary Examiner* — An T Nguyen
(74) *Attorney, Agent, or Firm* — Marshall, Gerstein & Borun LLP

(57) ABSTRACT

A method of collecting data in a field device includes receiving indications of variables for which data is collected, receiving indications of trigger events to trigger collection of data, receiving threshold values associated with each of the trigger events, monitoring the trigger events, and initiating data collection when at least one of the trigger events crosses one the threshold values associated with the corresponding trigger event. A method of tuning a PID controller in a field device includes setting a limited range for selecting a value for a control parameter of the PID controller, selecting the value of the control parameter, wherein the selected value is constrained to be within the limited range, transmitting the selected value to the field device, obtaining, from the field device, a measurement of a response of the field device to a setpoint change, and displaying the obtained response measurements to a user.

14 Claims, 14 Drawing Sheets

(52) U.S. Cl.
CPC ............... *G05B 2219/33331* (2013.01); *Y10T 137/7793* (2015.04)

(56) References Cited

U.S. PATENT DOCUMENTS

| | | | | |
|---|---|---|---|---|
| 2009/0112335 A1* | 4/2009 | Mehta | ................... | G05B 13/048 700/29 |
| 2013/0130734 A1* | 5/2013 | Rice | .................... | G01M 5/0066 455/517 |
| 2014/0324389 A1* | 10/2014 | Baldwin | ................ | G01D 9/005 702/187 |
| 2014/0352813 A1* | 12/2014 | Tharaldson | ........ | G05D 16/2093 137/505 |

OTHER PUBLICATIONS

"ER3000 Electronic Pressure Controller", User Manual, Feb. 20, 2013, 65 pages.
The Partial International Search Report of the International Searching Authority, dated Feb. 13, 2015, International Application No. PCT/US2014/040609 (4 pages).

\* cited by examiner

206

SYSTEM AND METHODS FOR CONTROL AND MONITORING OF A FIELD DEVICE

FIELD OF THE DISCLOSURE

The present disclosure is directed to process control systems and, more particularly, field devices such as pressure regulators and pilot loading mechanisms for pressure regulators used in process control systems.

BACKGROUND

Process control systems, such as distributed or scalable process control systems like those used in chemical, petroleum or other processes, typically include one or more process controllers communicatively coupled to at least one host or user workstation and to one or more field devices via analog, digital or combined analog/digital buses. The field devices, which may include, for example, control valves, valve positioners, switches and transmitters (e.g., temperature, pressure and flow rate sensors), perform functions within the process such as opening or closing valves and measuring process parameters. The process controller receives signals indicative of process measurements made by the field devices and/or other information pertaining to the field devices, and uses this information to implement a control routine to generate control signals, which are sent over the buses to the field devices to control the operation of the process. Information from each of the field devices and the controller is typically made available to one or more applications executed by the user workstation to enable an operator to perform any desired function regarding the process, such as viewing the current state of the process, modifying the operation of the process, etc. In the event that a field device fails, the operational state of the entire process control system can be jeopardized.

Field devices in a process plant include, in some instances, pressure regulators. The pressure regulators may be used by themselves to regulate the pressure of a gas, or may be used in combination with a pneumatically powered actuator actuating a valve. Electronic pressure regulators may be controlled by external programmable logic controllers or by on-board programming.

SUMMARY

In one aspect, an electronic pressure regulator comprises a regulator body having an inlet port coupled to a source of supply pressure, an outlet port for outputting a controlled pressure, and an exhaust port. The electronic pressure regulator also comprises an inlet valve coupled at an input of the inlet valve to the supply pressure and at an output of the inlet valve to the outlet port, and an outlet valve coupled at an input of the outlet valve to the outlet port and at an output of the outlet valve to the exhaust port. The electronic pressure regulator further comprises a controller disposed within the regulator body and operable to actuate the inlet valve and the outlet valve to adjust the controlled pressure delivered to the outlet port. The controller is programmed to receive indications of one or more variables for which data should be collected, receive indication of one or more trigger events to trigger collection of data, receive one or more threshold values associated with each of the one or more trigger events, monitor the one or more trigger events, and initiate data collection when at least one of the one or more trigger events crosses one or more of the threshold values associated with the corresponding trigger event.

In another aspect, a method for collecting data in a pressure regulating field device operating in a process control system includes receiving, at a processor, indications of one or more variables for which data should be collected. The method also includes receiving, at a processor, indications of one or more trigger events to trigger collection of data, and receiving, at a processor, one or more threshold values associated with each of the one or more trigger events. The method additionally includes monitoring the one or more trigger events, and initiating data collection when at least one of the one or more trigger events crosses one or more of the threshold values associated with the corresponding trigger event.

In still another aspect, a method of tuning a PID controller in a field device includes setting a limited range for selecting a value for a control parameter of the PID controller, and selecting the value of the control parameter, wherein the selected value is constrained to be within the limited range. The method also includes transmitting the selected value to the field device. The method further includes obtaining, from the field device, a measurement of a response of the field device to a setpoint change, and displaying the obtained response measurements to a user.

DETAILED DESCRIPTION

The present disclosure is directed to an intelligent pilot loading mechanism for a field device of a process control system such as a pressure regulator, for example, and, specifically, to methods of interaction with the pressure regulator for monitoring and/or controlling the regulator. In particular, routines that facilitate interaction with and control of the pressure regulator are disclosed. The routines allow a user to set-up operation of the pressure regulator, to tune control parameters of the regulator, to acquire data collected during tuning of the regulator and/or during on-line operation of the regulator, to construct profiles that include one or more commands to be performed by the regulator and to download such profiles to the regulator, to monitor regulator parameters in real-time during tuning and operation of the regulator, to perform automated diagnostic testing of the regulator, etc. Various routines described herein facilitate intelligent interaction with the regulator by limiting ranges of certain configurable and/or adjustable parameters of the regulator such that a user is prevented from programming the regulator with parameter values that are not desired and/or may damage the regulator, by allowing a user to set-up triggers to acquire data from the regulator, by allowing a user to set-up triggers to run automated testing of the regulator, and the like.

Figure 1:
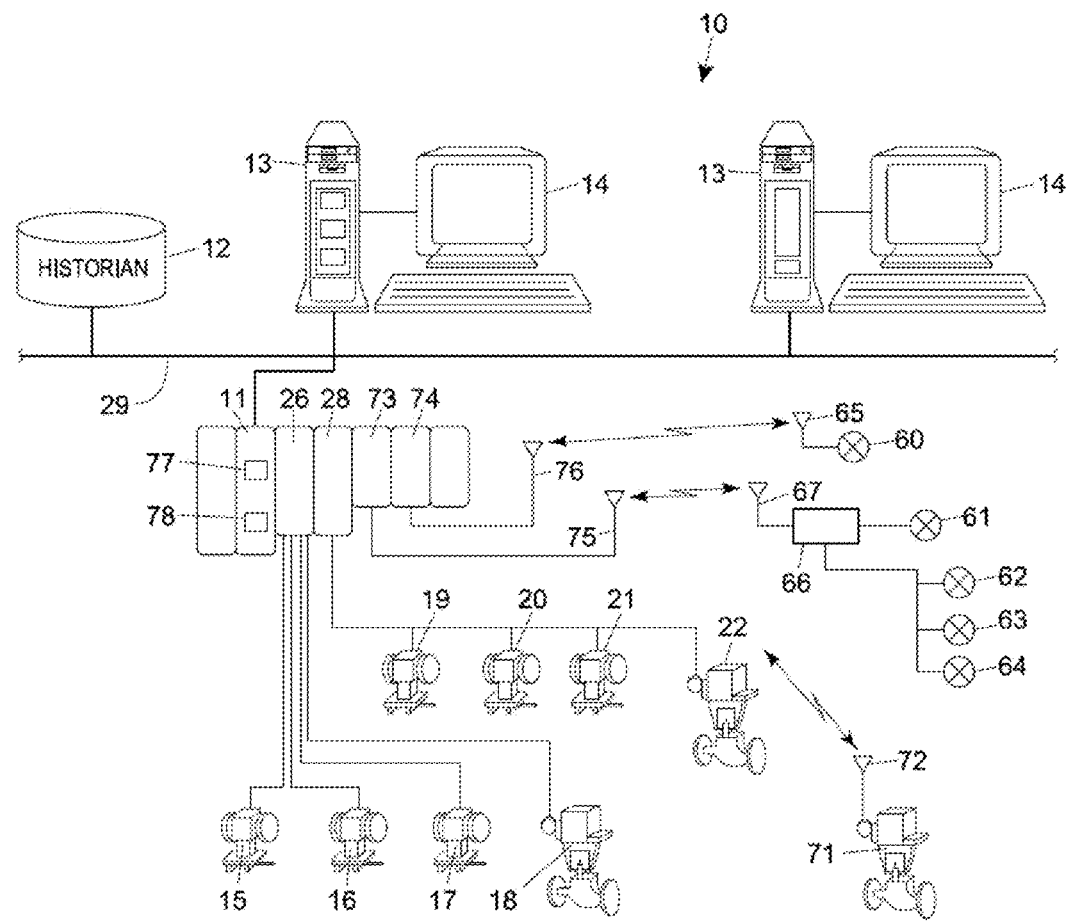
FIG. 1 is a schematic representation of a process control system having one or more intelligent regulator assemblies constructed in accordance with the principles of the present disclosure.

Referring now to FIG. 1, a process control system 10 constructed in accordance with one version of the present disclosure is depicted incorporating one or more field devices 15, 16, 17, 18, 19, 20, 21, 22, and 71 in communication with a process controller 11, which in turn, is in communication with a data historian 12 and one or more user workstations 13, each having a display screen 14. So configured, the controller 11 delivers signals to and receives signals from the field devices 15, 16, 17, 18, 19, 20, 21, 22, and 71 and the workstations 13 to control the process control system.

In additional detail, the process controller 11 of the process control system 10 of the version depicted in FIG. 1 is connected via hardwired communication connections to field devices 15, 16, 17, 18, 19, 20, 21, and 22 via input/output (I/O) cards 26 and 28. The data historian 12 may be any desired type of data collection unit having any desired type of memory and any desired or known software, hardware or firmware for storing data. Moreover, while the data historian 12 is illustrated as a separate device in FIG. 1, it may instead or in addition be part of one of the workstations 13 or another computer device, such as a server. The controller 11, which may be, by way of example, a DeltaV™ controller sold by Emerson Process Management, is communicatively connected to the workstations 13 and to the data historian 12 via a communication network 29 which may be, for example, an Ethernet connection.

As mentioned, the controller 11 is illustrated as being communicatively connected to the field devices 15, 16, 17, 18, 19, 20, 21, and 22 using a hardwired communication scheme which may include the use of any desired hardware, software and/or firmware to implement hardwired communications, including, for example, standard 4-20 mA communications, and/or any communications using any smart communication protocol such as the FOUNDATION® Fieldbus communication protocol, the HART® communication protocol, etc. The field devices 15, 16, 17, 18, 19, 20, 21, and 22 may be any types of devices, such as sensors, pressure regulators, control valve assemblies, transmitters, positioners, etc., while the I/O cards 26 and 28 may be any types of I/O devices conforming to any desired communication or controller protocol. In the embodiment illustrated in FIG. 1, the field devices 15, 16, 17, 18 are standard 4-20 mA devices that communicate over analog lines to the I/O card 26, while the digital field devices 19, 20, 21, 22 can be smart devices, such as HART® communicating devices and Fieldbus field devices, that communicate over a digital bus to the I/O card 28 using Fieldbus protocol communications. Of course, the field devices 15, 16, 17, 18, 19, 20, 21, and 22 may conform to any other desired standard(s) or protocols, including any standards or protocols developed in the future.

In addition, the process control system 10 depicted in FIG. 1 includes a number of wireless field devices 60, 61, 62, 63, 64 and 71 disposed in the plant to be controlled. The field devices 60, 61, 62, 63, 64 are depicted as transmitters (e.g., process variable sensors) while the field device 71 is depicted as a control valve assembly including, for example, a control valve and an actuator. Wireless communications may be established between the controller 11 and the field devices 60, 61, 62, 63, 64 and 71 using any desired wireless communication equipment, including hardware, software, firmware, or any combination thereof now known or later developed. In the version illustrated in FIG. 1, an antenna 65 is coupled to and is dedicated to perform wireless communications for the transmitter 60, while a wireless router or other module 66 having an antenna 67 is coupled to collectively handle wireless communications for the transmitters 61, 62, 63, and 64. Likewise, an antenna 72 is coupled to the control valve assembly 71 to perform wireless communications for the control valve assembly 71. The field devices or associated hardware 60, 61, 62, 63, 64, 66 and 71 may implement protocol stack operations used by an appropriate wireless communication protocol to receive, decode, route, encode and send wireless signals via the antennas 65, 67 and 72 to implement wireless communications between the process controller 11 and the transmitters 60, 61, 62, 63, 64 and the control valve assembly 71.

If desired, the transmitters 60, 61, 62, 63, 64 can constitute the sole link between various process sensors (transmitters) and the process controller 11 and, as such, are relied upon to send accurate signals to the controller 11 to ensure that process performance is not compromised. The transmitters 60, 61, 62, 63, 64, often referred to as process variable transmitters (PVTs), therefore may play a significant role in the control of the overall control process. Additionally, the control valve assembly 71 may provide measurements made by sensors within the control valve assembly 71 or may provide other data generated by or computed by the control valve assembly 71 to the controller 11 as part of its operation. Of course, as is known, the control valve assembly 71 may also receive control signals from the controller 11 to effect physical parameters, e.g., flow, within the overall process.

The process controller 11 is coupled to one or more I/O devices 73 and 74, each connected to a respective antenna 75 and 76, and these I/O devices and antennas 73, 74, 75, 76 operate as transmitters/receivers to perform wireless communications with the wireless field devices 61, 62, 63, 64 and 71 via one or more wireless communication networks. The wireless communications between the field devices (e.g., the transmitters 60, 61, 62, 63, 64 and the control valve assembly 71) may be performed using one or more known wireless communication protocols, such as the WirelessHART® protocol, the Ember protocol, a WiFi protocol, an IEEE wireless standard, etc. Still further, the I/O devices 73 and 74 may implement protocol stack operations used by these communication protocols to receive, decode, route, encode and send wireless signals via the antennas 75 and 76 to implement wireless communications between the controller 11 and the transmitters 60, 61, 62, 63, 64 and the control valve assembly 71.

As illustrated in FIG. 1, the controller 11 conventionally includes a processor 77 that implements or oversees one or more process control routines (or any module, block, or sub-routine thereof) stored in a memory 78. The process control routines stored in the memory 78 may include or be associated with control loops being implemented within the process plant. Generally speaking, and as is generally known, the process controller 11 executes one or more control routines and communicates with the field devices 15, 16, 17, 18, 19, 20, 21, 22, 60, 61, 62, 63, 64, and 71, the user workstations 13 and the data historian 12 to control a process in any desired manner(s). Additionally, any one of the field devices 18, 22, and 71 in FIG. 1, each of which is depicted as a control valve assembly, can include an intelligent control valve actuator constructed in accordance with the principles of the present disclosure for communicating with the process controller 11 in order to facilitate monitoring of the actuator's health and integrity.

Figure 2:
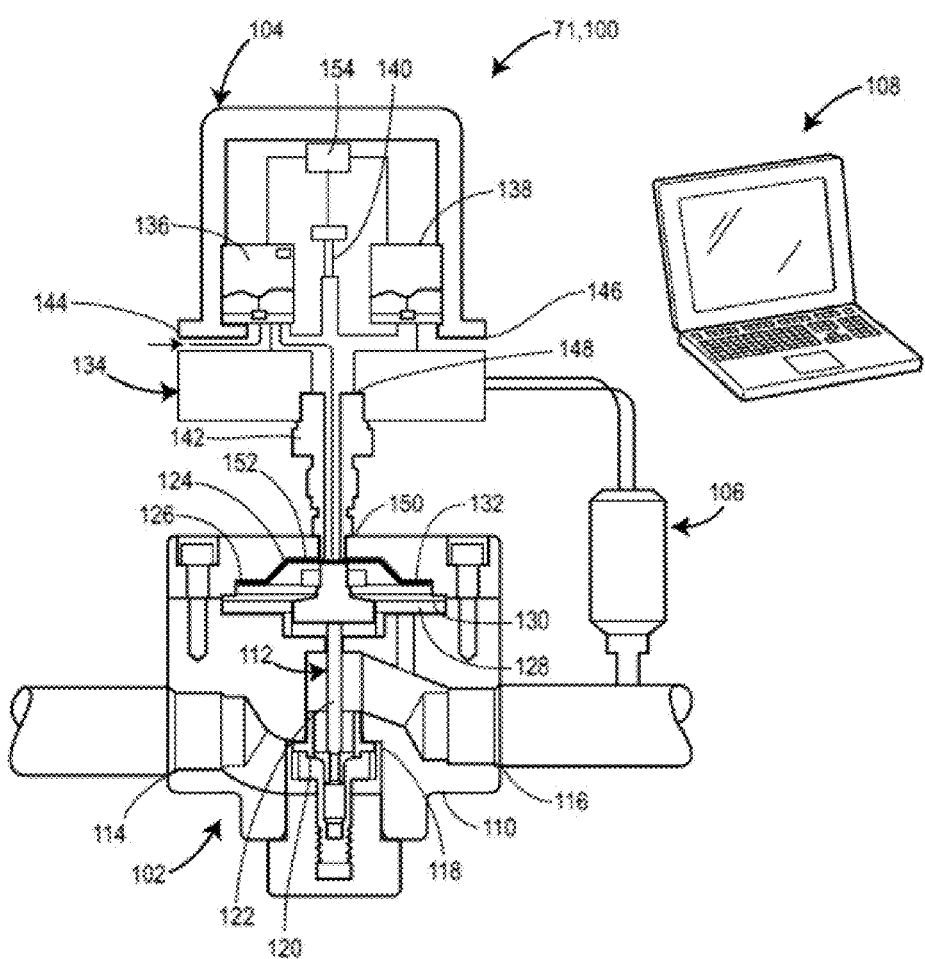
FIG. 2 is a cross-sectional side view of one version of an intelligent regulator assembly constructed in accordance with the principles of the present disclosure.

Referring now to FIG. 2, for the sake of description, field device 71 from FIG. 1 is shown as an intelligent regulator assembly 100 constructed in accordance with the principles of the present disclosure. In FIG. 2, the intelligent regulator assembly 100 includes a regulator 102, a pilot device 104, and a feedback pressure sensor 106. Additionally, FIG. 2 depicts an optional personal computing device 108 communicatively coupled to the pilot device 104 to enable user interaction with the pilot device 104, as will be described.

The regulator 102 includes a valve body 110 and a control assembly 112. The valve body 110 defines an inlet 114, an outlet 116, and a gallery 118 defining a seating surface 120. The control assembly 112 is carried within the valve body 110 and includes a control element 122 operably connected to a diaphragm assembly 124. The control element 122 is movable between a closed position in sealing engagement with the seating surface 120 and an open position spaced away from the seating surface 120 in response to pressure changes across the diaphragm assembly 124. As depicted, the diaphragm assembly 124 includes a diaphragm 126 disposed within a diaphragm cavity 128 of the valve body 110 of the regulator 102. A bottom surface 130 of the diaphragm 126 is in fluid communication with the outlet 116 of the valve body 110 and a top surface 132 of the diaphragm 126 is in fluid communication with the pilot device 104 via a pilot opening 150 in the valve body 110.

The pilot device 104 includes a valve body 134, an inlet valve 136, an exhaust valve 138, a pressure sensor 140, and an outlet adaptor 142. The valve body 134 defines an inlet port 144, an exhaust port 146, and an outlet port 148. The inlet port 144 is adapted to be connected to a source of supply gas for loading the dome 152 of the regulator 102, as will be described. As depicted, the inlet valve 136 is disposed adjacent to the inlet port 144, the exhaust valve 138 is disposed adjacent to the exhaust port 146, and the outlet adaptor 142 extends from the outlet port 148 and to the pilot opening 150 in the valve body 110. Thus, the outlet adaptor 142 provides fluid communication between the pilot device 104 and the regulator 102. The pressure sensor 140 is disposed in the valve body 134 of the pilot device 104 at a location between the inlet and exhaust valves 136, 138. As such, the pressure sensor 140 is operable to sense the pressure between the inlet and exhaust valves 136, 138, as well as in the outlet port 148, the outlet adaptor 142, and the diaphragm cavity 128 adjacent to the top surface 132 of the diaphragm 126. This portion of the diaphragm cavity 128 can be referred to as the dome 152 of the regulator 102. In one version of the pilot device 104 the inlet and exhaust valves 136, 138 can be solenoid valves such as Pulse Width Modulation (PWM) solenoid valves and the pressure sensor 140 can be a pressure transducer. Moreover, the inlet and exhaust valves 136, 138 and the pressure sensor 140 can be communicatively coupled to an on-board controller 154, which can store logic and/or direct some or all of the functionality of the pilot device 104, as will be described below.

Still referring to FIG. 2, the feedback pressure sensor 106 of the assembly 100 includes a pressure transducer arranged to detect the pressure at the outlet 116 of the regulator 102 and transmit signals to the pilot device 104 and, more particularly, to the on-board controller 154 of the pilot device 104. Based on the signals received by the on-board controller 154 from the feedback pressure sensor 106, the pilot device 104 opens and/or closes the inlet and exhaust valves 136, 138 to control the pressure in the dome 152 of the regulator 102, which in turn, controls the position of the control element 122 and ultimately the pressure at the outlet 116 of the regulator 102.

Specifically, during normal operation, the pressure at the outlet 116 of the regulator 102 is controlled and maintained as desired by adjusting the pressure in the dome 152 of the regulator 102. This is achieved via operation of the pilot device 104 and feedback pressure sensor 106. For example, in one version, the feedback pressure sensor 106 detects the pressure at the outlet 116 every 25 milliseconds and transmits a signal to the on-board controller 154 of the pilot device 104. The on-board controller 154 compares this signal, which is indicative of the pressure at the outlet 116, to a desired set-point pressure and determines if the outlet pressure is less than, equal to, or greater than the set-point pressure. Based on this determination, the pilot device 104 manipulates either or both of the inlet and exhaust valves 136, 138 to adjust the pressure in the dome 152. That is, if the sensed outlet pressure is lower than the desired set-point pressure, the on-board controller 154 activates the inlet valve 136 (e.g., instructs the inlet valve 136 to open and the exhaust valve 138 to close). In this configuration, gas enters the inlet port 144 of the pilot device 104 and increases the pressure in the dome 152, which causes the diaphragm assembly 124 to urge the control element 122 downward relative to the orientation of FIG. 2, which opens the regulator 102 and increases flow and ultimately pressure at the outlet 116. In contrast, if the pressure sensed at the outlet 116 by the feedback pressure sensor 106 is determined to be higher than the desired set-point pressure, the on-board controller 154 activates the exhaust valve 138 (e.g., instructs the exhaust valve 138 to open and the inlet valve 136). In this configuration, gas in the dome 152 exhausts out through the exhaust port 146 of the pilot device 104 to decrease the pressure on the top surface 132 of the diaphragm 126. This allows the outlet pressure to urge the diaphragm assembly 124 and control element 122 upward relative to the orientation of FIG. 2, which closes the regulator 102 and decreases flow and ultimately pressure at the outlet 116.

Based on the foregoing description, it should be appreciated that the pilot device 104 and the feedback pressure sensor 106 operate in combination with each other to intermittently, yet frequently, monitor the pressure at the outlet 116 of the regulator 102 and adjust the pressure in the dome 152 until the pressure at the outlet 116 is equal to the set-point pressure.

In embodiments, the personal computing device 108 described with reference to FIG. 2 includes one or more routines, embodied as computer-readable instructions stored on a memory device (e.g., volatile or non-volatile memory devices such as Flash memory, RAM, magnetic media, etc.)

or other non-transitory computer-readable media (e.g., optical discs, etc.). The one or more routines may facilitate for a user of the personal computing device 108 interaction with the intelligent regulator 100. The personal computing device 108 (referred to interchangeably as a computer) may be communicatively coupled to the intelligent regulator 100 in any known method, including, by way of example, universal serial bus (USB), RS-232, RS-485, WiFi, Bluetooth, or any other suitable communication connection. In some embodiments, the connection between the computer 108 and the regulator 100 is temporary. For example, the computer 108 is connected to the regulator 100 to program the regulator 100, to download information from the regulator 100, to upload information to the regulator 100, to perform diagnostics on the regulator 100, etc. In other embodiments, the connection between the computer 108 and the regulator is permanent or semi-permanent. For example, the computer 108 corresponds to the workstation 14 coupled to the via the controller 11, in an example embodiment.

The computer 108 and, in particular, a processor of the computer 108 may execute the one or more routines to cause the processor to perform actions related to the configuration, management, maintenance, diagnosis, and/or operation of the regulator 100. For example, one of the routines may perform an automated tuning procedure of the regulator 100. One of the routines may facilitate manual tuning of the regulator 100. A routine may cause the processor to display a response of the regulator to one or more stimuli and, in embodiments, the displayed response may be graphical in nature (e.g., may be a plot screen). A routine may allow a user to program a setpoint of the regulator 100. The controller 154 may include or implement a proportional-integral-derivative (PID) controller, and one or more routines may allow a user to adjust proportional, derivative, and/or integral constants and/or integral limits and/or deadband parameters of the PID controller. Other routines may allow a user to cause the regulator 100 to acquire and store data, and may allow a user to retrieve stored data from the regulator 100. Still another routine may allow a user to set up triggers to collect data in certain circumstances (e.g., when a particular pressure, error, or input signal reaches a threshold value). Other routines may allow a user to set control modes, perform calibration, set control limits, set diaphragm protection values, run diagnostic procedures (e.g., a solenoid leak test), and the like. Further, one or more routines may facilitate the use of profiles on the regulator 100.

Figure 3:
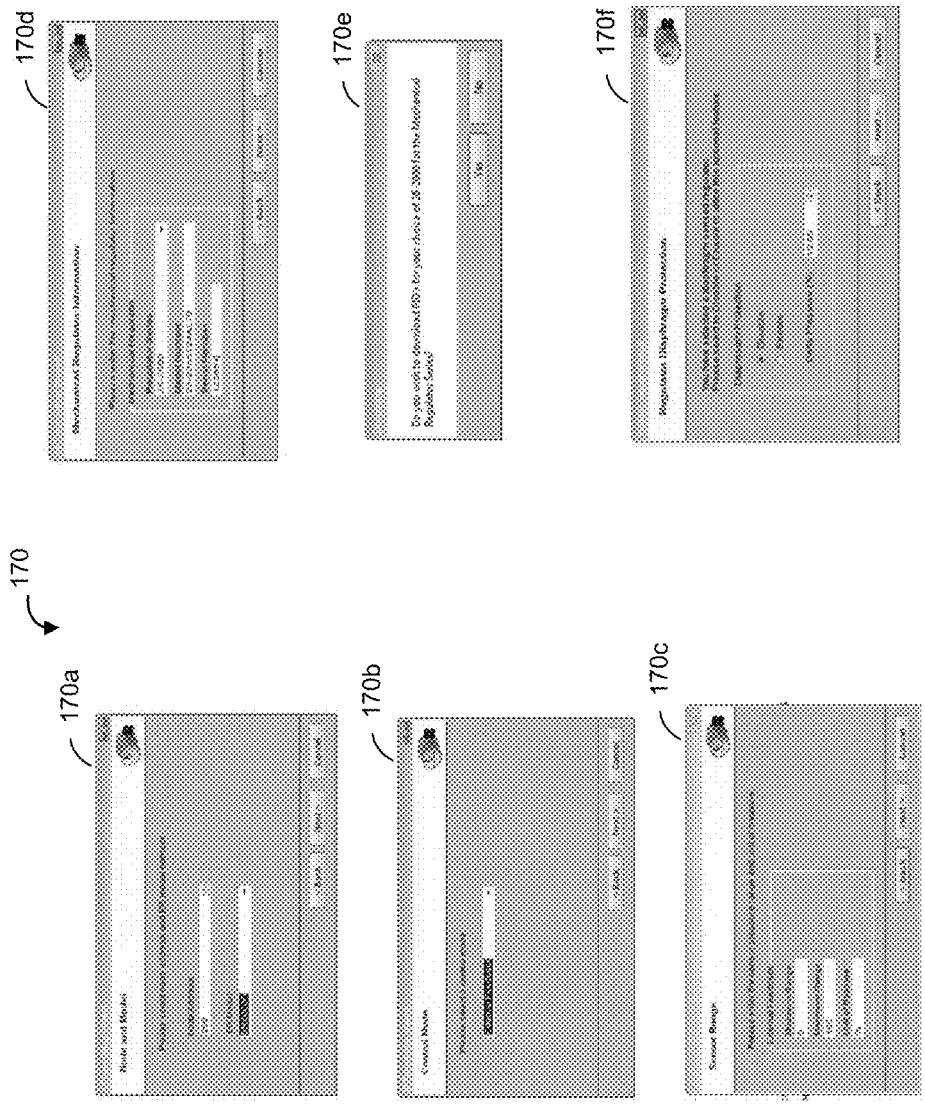
FIG. 3 depicts several example displays generated by the setup routine, according to an embodiment.

In an embodiment, the one or more routines include a setup routine that facilitates initial setup of the controller 154 of the regulator 100 and sets up communication between the computing device 108 and the controller 154. FIG. 3 depicts several example displays 170 generated by the setup routine, according to an embodiment. The displays 170 may be presented to a user in a sequence of displays, for example upon installation and initiation of the device 100. A node and model window 170a may be presented to a user to allow the user to enter a node address of the regulator 100 and model information (e.g., a model type) of the regulator 100. The node and model window 170a may allow a user to enter a single node address of the regulator 100 in communication with the computing device 108 and/or may allow a user to enter several node addresses for each one of multiple regulators in communication with the computing device 108, for example when multiple regulators in communication with the computing device 108 are connected in a daisy-chain fashion. A control mode window 170b may be presented to a user to allow the user to select a feedback mode for the controller 154. A dropdown menu may present several options of feedback modes to the user. The feedback mode options may include one or more of an external feedback mode, an internal feedback mode and a cascade feedback node. Selecting external feedback may setup the controller 154 to receive feedback from an external source, such as from the feedback sensor 106. When internal feedback mode is selected, an internal sensor of the controller 154 may be used to provide feedback. When cascade feedback mode is selected, an external sensor and an internal sensor may be used to provide feedback in cascaded fashion, for example, in an embodiment.

A sensor range window 170c may allow a user to enter a default range and default units of measurement to be used for plotting feedback received from the controller 154. The appropriate ranges to be entered in the window 170c may depend on the feedback mode selected in the window 170b. For example, when external feedback mode is selected, appropriate units of measurement may be "%" and an appropriate range may be 0 to 100. As another example, when internal feedback is selected, appropriate units may be pounds per square inch ("psig"), and the appropriate range may be 0 to 100.

A regulator window 170d may be presented to a user to allow the user to enter information about the regulator 100, such as a part number of the regulator 100, a serial number of the regulator 100, etc. Next, a window 170e may allow the user to download default PID controller settings to the controller 154. Further, a window 170f may be presented to a user to allow the user to enable a diaphragm protection mode (described in more detail below). It is noted that some of the displays 170a-170f may be omitted from the startup routine and/or additional displays may be added to the startup routine. Further, the displays of the startup routine may be presented to a user in any desired order.

Figure 4:
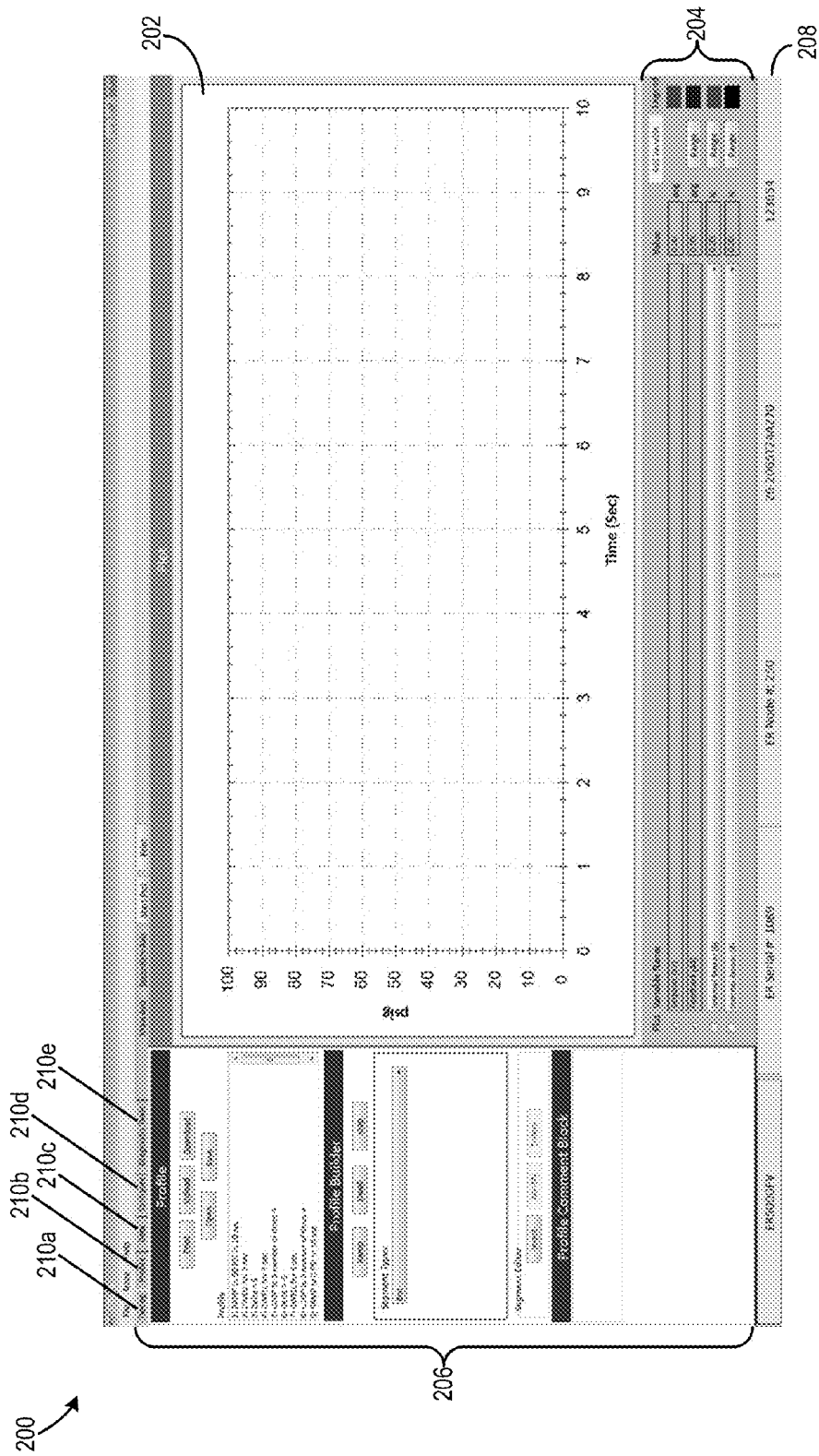
FIG. 4 is an example screen shot of a display for performing one or more interface operations with the intelligent regulator.

Turning now to FIG. 4, an illustrative display 200 depicts a screen generated by the one or more routines operating on the computer 108. The display 200 depicts a plot screen 202, a set of plot screen variable controls 204, a functional tab area 206, and a footer area 208. The plot screen 202 provides a user with a precise visual display of moment-by-moment interaction between a setpoint setting of the regulator 100 and the response of the regulator 100 to the setpoint. At the same time, the plot screen variable controls 204 facilitate the selection and control of the variables displayed in the plot screen 202. The plot screen variable controls 204 displays variables that may be tracked/plotted in the plot screen 202, and may allow the user to select the input sources to the controller 154 that the user wishes to track and/or plot. The input sources that are tracked/plotted in the plot screen 202 may include one or more default variables, which are plotted by default in the plot screen 202 and/or user-selected variable that the user can select to be plotted in the plot screen 202. In the example display 200, the pot screen variable controls 204 indicate that setpoint and feedback data is plotted by default, and allows the user to select to track/plot up to two additional variables, such as data provided by various sensors internal to the regulator 100. In embodiments, when one or more additional variables are selected to be displayed in the plot screen 202, a secondary vertical axis may be displayed in the screen 202 to display the one or more additional variables.

The functional tab area 206 facilitates the implementation of and interaction with the various routines described above. For example, activation of a tab 210a (i.e., bringing to the foreground the information on the tab 210a) will display controls related to tuning the parameters of the regulator 100; activation of a tab 210b (as depicted in the display 200 of FIG. 4) will display controls related to using profiles with the regulator 100; activation of a tab 210c will display controls related to tracking, recording, downloading, and performing other actions related to data of the regulator 100; activation of a tab 210d will display controls related to the configuration of the regulator 100; and activation of a tab 210e will display controls related to performing diagnostic routines on the regulator 100.

The footer area 208 displays information about the regulator 100 communicatively coupled to the computer 108 and on which the routines are currently operating. For example, some or all information entered via displays 170 of FIG. 3 may be displayed in the footer area 208. The information in the footer area 208 may include, for example, model information, serial number information, node address information, part number information, the unit currently communicating with the routines (e.g., where multiple regulators are connected in daisy-chain fashion), and the like.

As described above, the routines operating on the computer 108 may facilitate interaction with and control of the controller 154. In an embodiment, the controller 154 comprises a multi-purpose processor operable to execute machine-readable instructions stored on a memory device of the on-board controller 154. In other embodiments, the controller 154 comprises a programmable logic device, such as an FPGA, a DSP, an ASIC, or the like. In any event, the on-board controller 154 may operate to allow the regulator 100 to self-regulate in situations such as start/stop operations, setpoint changes, changes in operating condition, etc. For example, if the on-board controller 154 includes or implements a PID controller, the controller 154 may include a tuning module (e.g., in the form of machine-readable instructions stored in a memory device) configured to communicate with the computer 108 and, more specifically, with one or more routines executed by the computer 108, to allow a user to configure and tune control parameters of the PID controller. The tuning module of the controller 154 may be configured to receive control parameter values as the values from the computer 108 as the values are adjusted by a user at the computer 108, to set the control parameters to the received control parameter values, to measure control loop response with the control parameters set to the received control parameter values, and to provide measured response data to the computer 108 to be displayed to the user at the computer 108. Thus, real-time response data may be made available to the user to facilitate tuning the control parameter of the PID controller to achieve a desired control loop response.

Generally speaking, a PID controller operates to generate an error signal based on a difference between the desired pressure (setpoint) at the outlet 116 and the actual pressure at the outlet 116 of the pressure regulator 102. In particular, the PID controller may compare a setpoint indicating a desired pressure at the outlet 116 to an actual pressure measured at the outlet 116 and received from the feedback pressure sensor 106, and may generate an error signal representing a difference between the desired pressure and the actual pressure at the outlet 116. When the difference between the desired pressure and the actual pressure is negligible or non-existent (zero), no adjustment in the pilot device 104 need be performed. However, when a non-negligible or non-zero error signal is generated by the PID controller, the controller 154 may act to minimize the error. When the error is caused by a change in the setpoint provided to the controller 154, the controller 154 acts to adjust pressure in the dome 152 to lower or raise the pressure at the outlet 116 to the new setpoint. When the setpoint remains constant, and the error is due to a change in operating parameters of the device 100, the controller 154 acts to adjust the dome pressure to return the outlet pressure to the desired pressure indicated by the setpoint.

Figure 5:
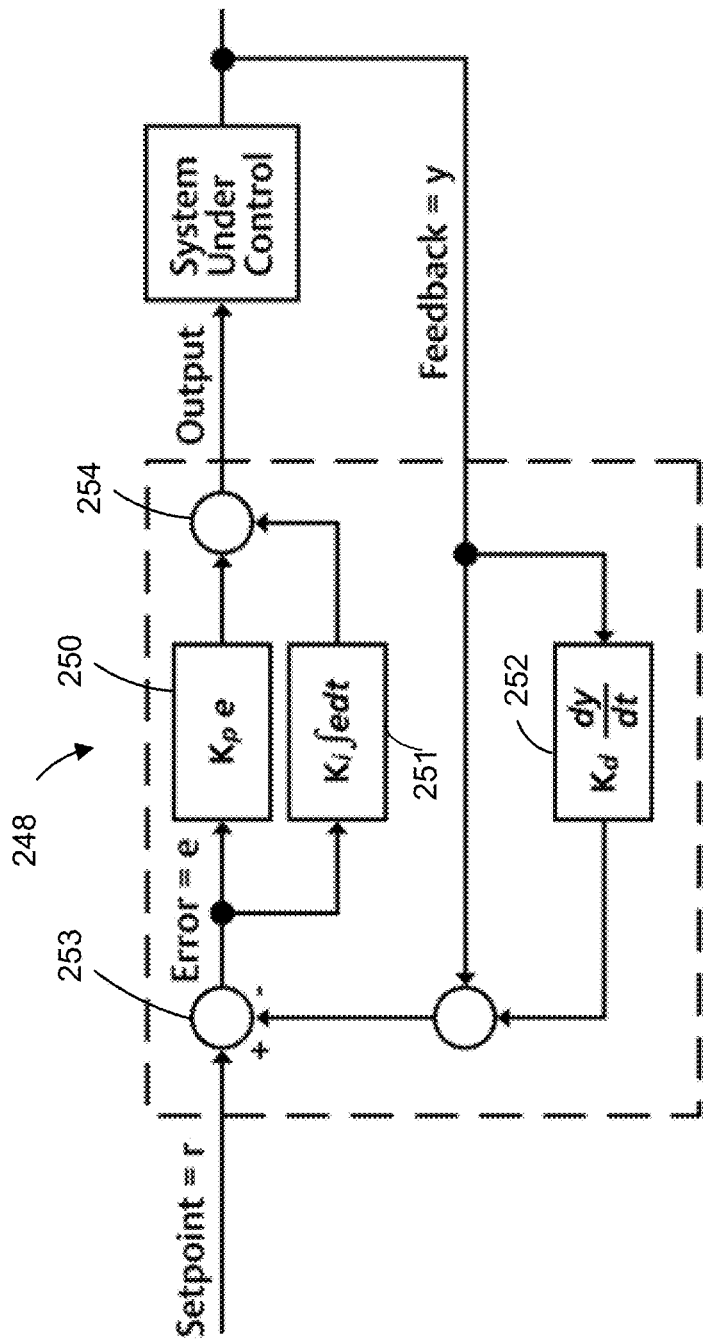
FIG. 5 is a block diagram illustrating an example PID controller.

Turning briefly to FIG. 5, a block diagram of an example PID controller 248 is illustrated as having a proportional block 250, an integral block 251 and a derivative block 252. A feedback signal (e.g., from the sensor 106 of FIG. 2) is applied to the derivative block 252 at which the derivative (or the rate of change) of the feedback signal is multiplied by a derivative constant $K_d$ to attenuate the feedback signal prior to comparing the feedback signal to the setpoint at a summing junction 253. The error signal at the output of the summing junction 253 is applied to the proportional block 250 and to the integral block 251. The proportional block 250 multiplies the error signal by a proportional constant $K_p$. The integral block 251 calculates or otherwise determines an integral of accumulated errors, and multiples the integral of accumulated errors by an integral constant $K_i$. The outputs of the blocks 250, 251 are applied to a summing junction 254 which produces the output error signal of the PID controller 248.

Tuning the PID controller generally comprises selecting the optimal values for control parameters of the PID controller 248, such as the proportional constant $K_p$, the integral constant $K_i$ and/or the derivative constant $K_d$ to achieve desired response characteristics of the control loop. In an embodiment, tuning the PID controller 248 involves adjusting the value of the control parameters to achieve a desired balance between various operational parameters of the control loop, such as the rise time defining how quickly a desired setpoint is reached by the control loop, instability of the control loop defining the amount of overshoot and/or ringing in the response of the control loop to a setpoint change, settling time of the response, offset, or steady state error in the response, etc. For example, an increase in the value of the proportional constant $K_p$ may result in a quicker response to a change in the error produced by the PID controller, but may also cause a greater overshoot and higher degree of ringing in the response. To decrease the overshoot and/or the degree of ringing, a lower value of the proportional constant $K_p$ may be needed. However, a lower value of the proportional constant $K_p$ also results in a slower response time of the loop.

In some situations, the control loop settles at a value slightly higher than or slightly lower than the desired value indicated by the setpoint, resulting in an offset, or a steady state error of the response. Such offset may be corrected by increasing the value of the integral constant $K_i$. Adjusting the value of derivative constant $K_d$ may correct for overshoot and ringing in the response, but may also overdamp the system, causing a slower system response. In embodiments, careful selection and tuning of control parameters (e.g., proportional constant, integral constant, derivative constant, and/or other PID control parameters described in more detail below) of a PID controller portion of the controller 154 is facilitated by one or more routines operating on the computer 108.

In some embodiments, the PID controller included in the controller 154 omits the integral block 251 and/or the derivative block 252. For example, when the integral block 251 and the derivative block 252 are omitted, PID controller acts as a proportional controller and generates the error based solely on the proportional term weighted by the proportional constant $K_p$. As another example, when the derivative block 252 is omitted, the PID controller acts as a proportional and integral controller and generates the error signal based on a sum of the proportional term weighted by the proportional constant $K_p$ and the integral term weighted by the integral constant $K_i$.

Figure 6A:
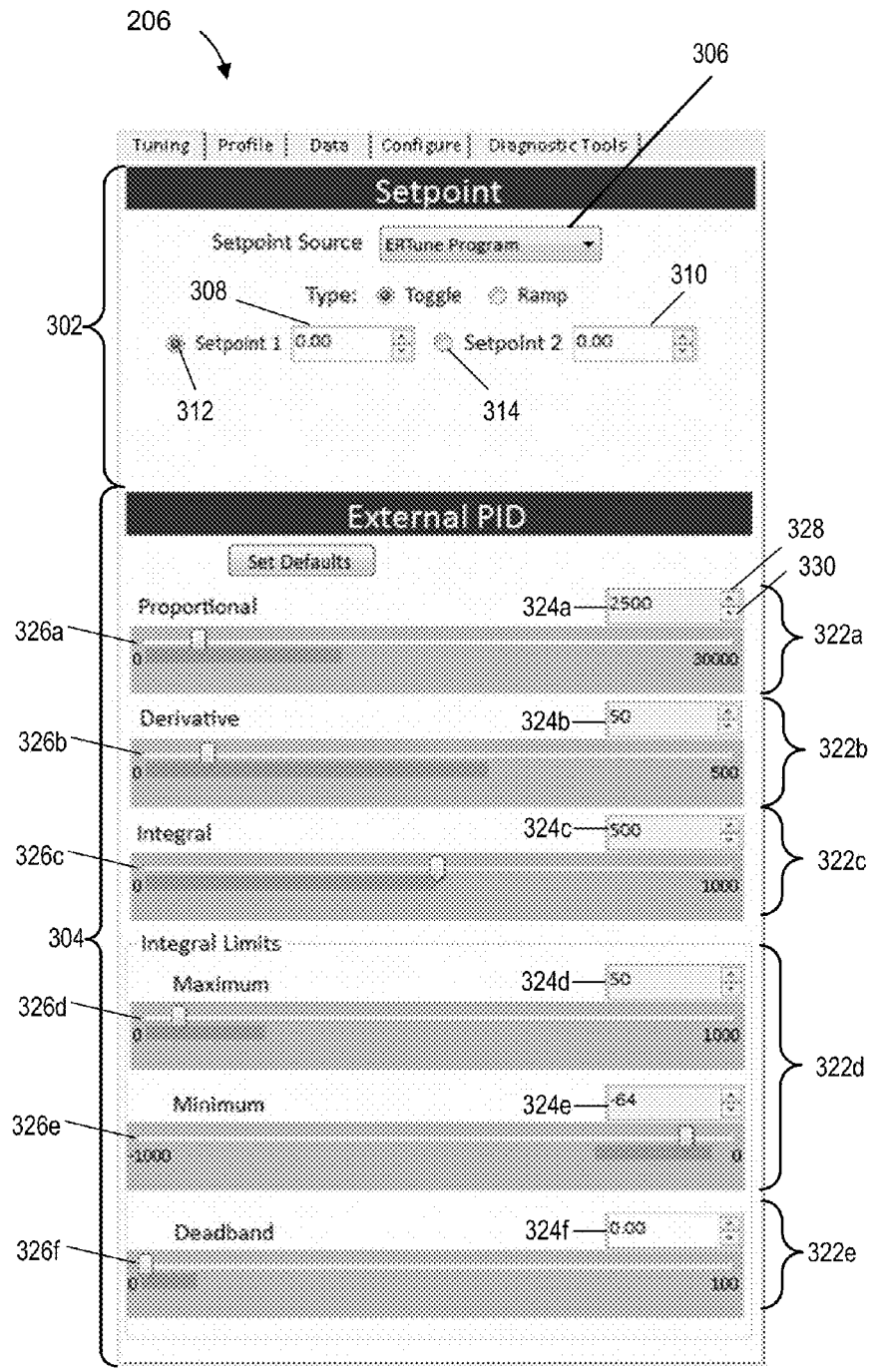
FIG. 6A is a detail view of a tune portion, that facilitates tuning of a PID controller, of the example screen shot of FIG. 5.

Turning now to FIG. 6A, a detail view of the functional tab area 206 is illustrated with the tuning tab 210a selected. The tuning tab 210a allows a user to provide a setpoint change to the controller 154, to adjust control parameters in the PID controller of the controller 154, and to observe the response of the system 100 to the provided setpoint change when the control parameters in the PID controller are set to selected control parameter values. The tuning tab 210a includes a setpoint panel 302 and a PID parameter panel 304. The setpoint panel 302 allows a user to select a setpoint source to be used for tuning the PID controller in the controller 154. An area 306, which may be a drop box, a list, or any other form of display that allows selection of an option from several available options, allows a user to select a setpoint source. In an embodiment, options for a setpoint source include an analog input source, an external device setpoint source, and a setpoint generated internally to the computer 108, in which case a regular mode or a toggle mode are available. Selecting the analog input setpoint option sets the controller 154 in a mode to receive a setpoint from an analog input source (e.g., a 4-20 mA input source, a 1-5V analog input source, etc.). Selecting the analog input setpoint option sets the controller 154 in a mode to receive a setpoint from an external digital device, such as programmable logic control (PLC) device or a toggle switch. When the internal setpoint generator mode is selected, the setpoint signal is generated internally to the computer 108. In this case, the setpoint panel 302 allows the user to further select between a toggle mode or a ramp mode of generation of the setpoint signal.

When toggle mode is selected, a setpoint change is provided to the controller 154 via the computing device 108. A user is able to specify a first, or minimum, setpoint value by entering the first setpoint value into a box 308 and a second, or maximum, setpoint value by entering the second setpoint value into a box 310. The user may then toggle between the first setpoint and the second setpoint, for example by using corresponding radio buttons 312, 314, by hitting the spacebar, or in another suitable manner.

Figure 6B:
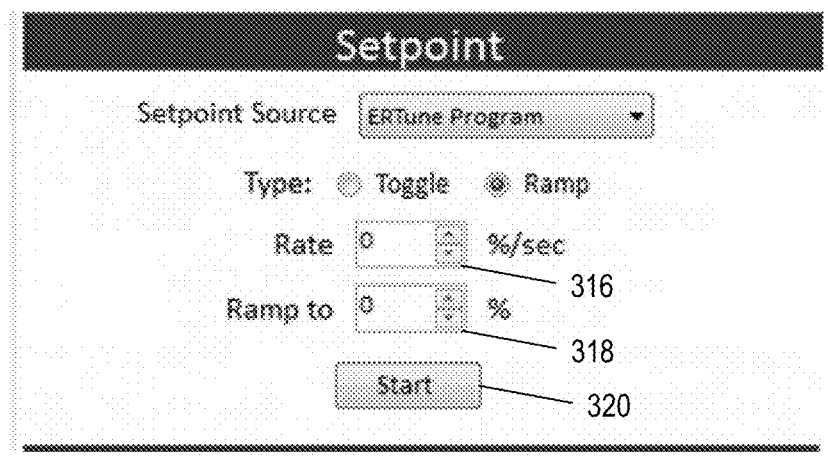
FIG. 6B depicts a setpoint portion of the tune portion of FIG. 6A.

When ramp mode is selected, the computing device 108 generates a setpoint signal by ramping the setpoint value to a maximum value specified by the user and at a rate specified by the user, for example by generating a triangular wave alternating rising and falling of setpoint values. FIG. 6B illustrates the setpoint panel 302 displayed to a user when the ramp mode is selected. A box 316 allows the user to enter a rate value to specify the rate at which to ramp the setpoint change, and a box 318 allows the user to specify the maximum value of the setpoint. Hitting the start button 320 may initiate generation of the setpoint signal, and the response of the system 100 to the setpoint ramp change may be observed in the screen 202 (FIG. 4).

Referring again to FIG. 6A, values of the control parameters of the PID controller may be adjusted using the PID panel 304. The PID panel 304 includes a proportional constant ($K_p$) adjustment section 322a, a derivative constant ($K_d$) adjustment section 322b, and an integral constant ($K_i$) adjustment section 322c. The PID panel 304 also includes an integral limits section 322d. The integral limit section 322d allows a user to set or adjust a maximum integral limit and a minimum integral limit to limit the integral term of the PID controller to accumulate errors above and below the corresponding limits set in the section 322d. Setting integral limits in the section 322d may allow the use of higher values of the integral constant while reducing or minimizing the risk of overshoot, ringing and/or windup in response to a setpoint change of the system 100. Higher values of the integral constant, in turn, may improve steady state performance of the control loop, for example by more quickly reducing and/or eliminating steady state errors during operation of the control loop. The PID panel 304 additionally includes a deadband adjustment section 322e that allows a user to specify a deadband range around the setpoint provided to the PID controller. During operation of the PID controller, errors within the specified deadband range are ignored by the PID controller. Setting a deadband range for the PID controller may prevent triggering process adjustments by the PID controller caused by system noise and/or transient errors.

In an embodiment, a user is able to enter a parameter in the panel 304 by entering the value into a box 324 in the corresponding parameter section 322. Additionally or alternatively, the user may be able to adjust a parameter value by using a slide bar 326 in the corresponding parameter section 322. To further facilitate adjustment of values in the panel 304, each box 326 may include an up arrow 328 and a down arrow 330, as illustrated in the section 322a, for clarity.

As illustrated in FIG. 6A, a user may affect an adjustment of a control parameter in the PID panel 302 by entering a new parameter value in a corresponding box 324 for the desired parameter, or may adjust a value by sliding a corresponding slide bar 326. To aid a user in the PID controller tuning process, in some embodiments, the PID panel 304 displays recommended ranges for the various control parameters discussed above. For example, a line (e.g., a green line) may be displayed in the vicinity of each of one or more of the slide bars in the section 322 to indicate a recommended range for the corresponding control parameter. For example a line may be displayed right below or right above a slide bar in the sections 322 to indicate a recommended range for the corresponding control parameter. In some embodiments, a user is prevented from entering certain values of the control parameters, such as control parameter values that may damage the device 100. In other words, selection of a control parameter may be constrained within a certain limited range of values of the control parameter. For example, motion of each of the slide bars 326 may be limited to certain ranges of control parameters, wherein the user is prevented from setting a control parameter to values outside of the motion range of the slide bar used to adjust the parameter. Similarly, the up arrow 328 and the bottom arrow 330 of each box 324 may be limited to a respective maximum and minimum value for the corresponding control parameter. For example, the up arrow 328 may allow a user to continually change the associated parameter value until reaching a maximum value within the limited range, and the bottom arrow 330 may allow the user to continually decrease the control value until reaching a minimum value within the limited range. Further, each box 324 may be set up to not accept values outside of a certain range or certain ranges of acceptable values for the corresponding parameter.

Figure 7:
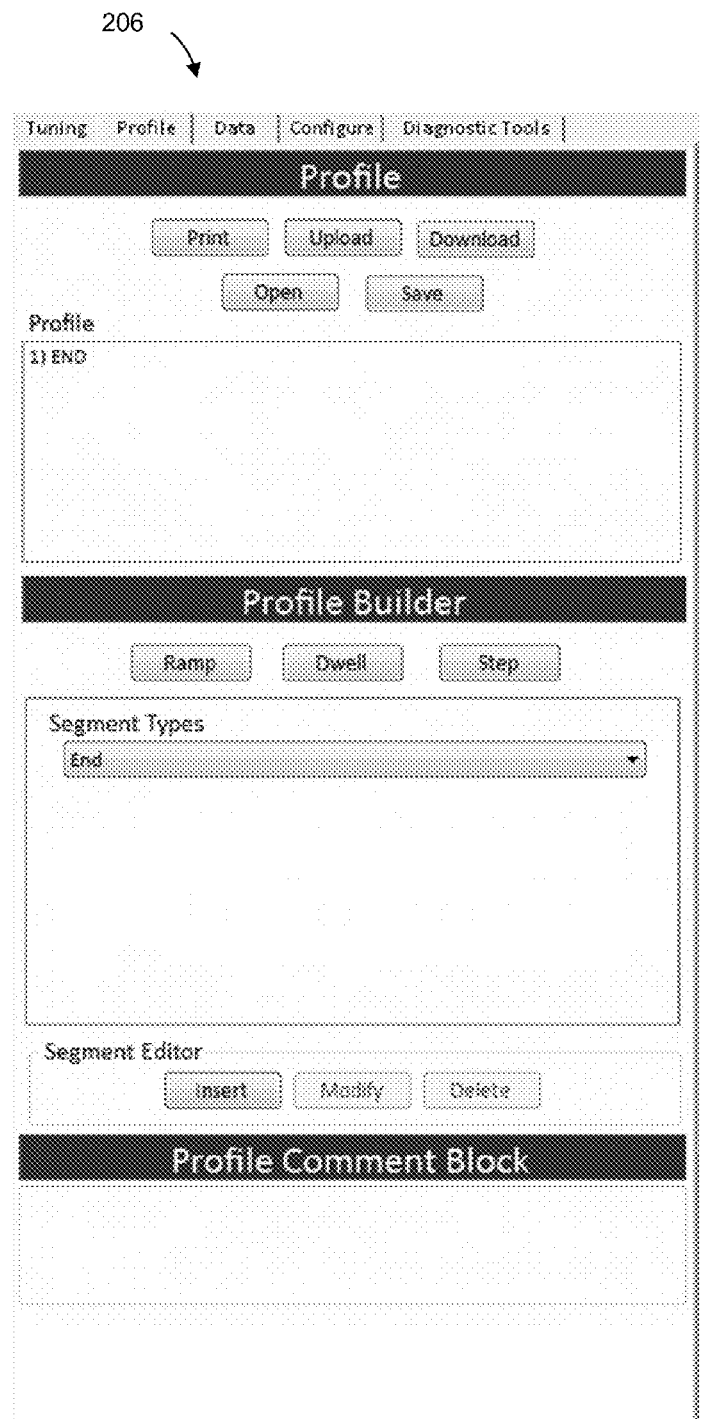
FIG. 7 is a detail view of a profile portion, including a profile builder panel, of the example screen shot of FIG. 4.

FIG. 7 depicts a detail view of the functional tab area 206 (FIG. 4) with the profile tab 210b selected. The profile tab 210b allows a user to construct a profile and to download the profile to the controller 154. In embodiments, the profile is a multi-step command sequence that may be stored in a memory of the controller 154 and may be executed on a processor of the controller 154 to implement the one or more commands in the controller 154.

Figure 8:
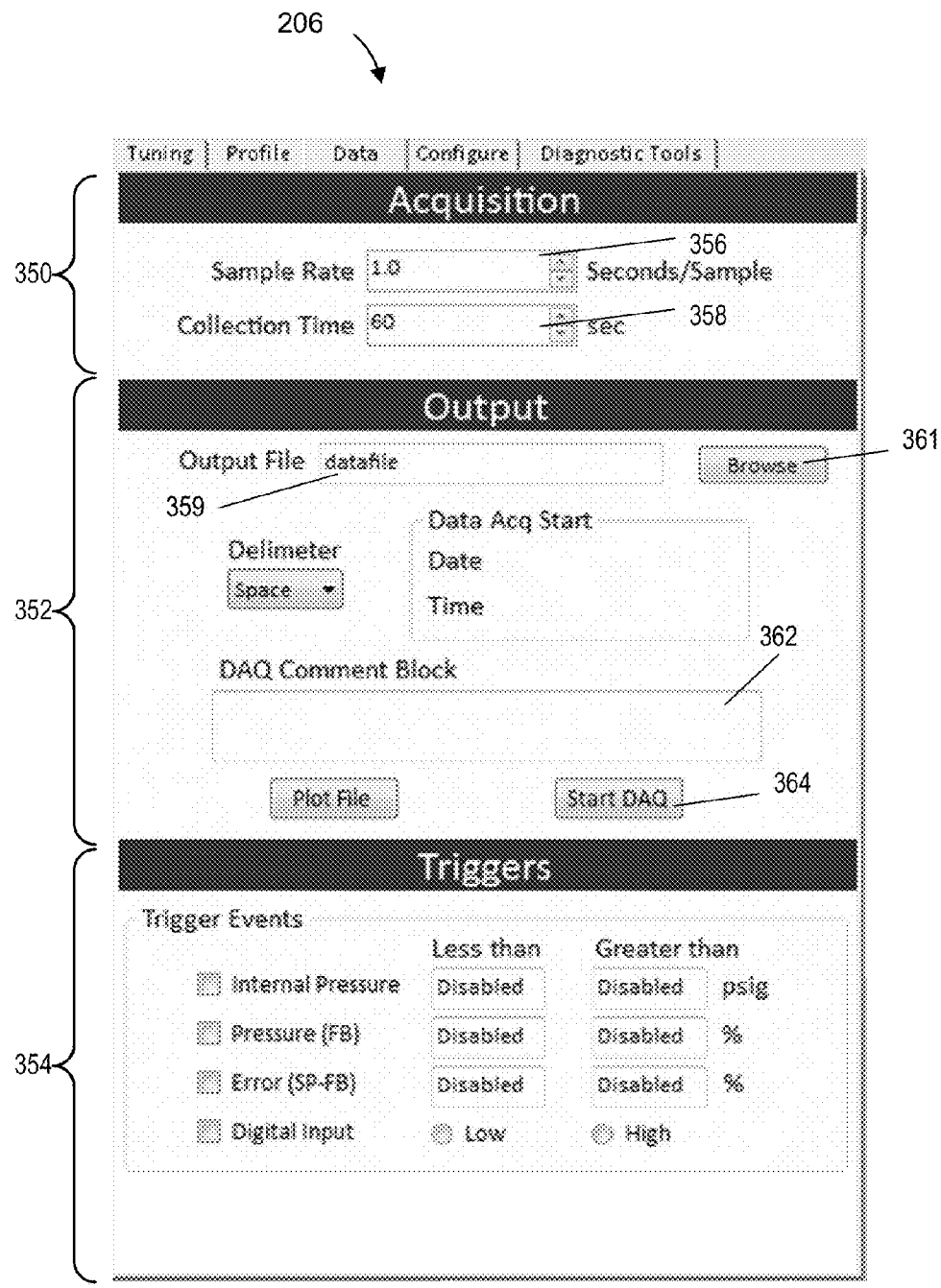
FIG. 8 is a detail view of a data acquisition portion of the example screen shot of FIG. 4.

FIG. 8 depicts a detail view of the functional tab area 206 (FIG. 4) with the data tab 210c selected. With the data tab 210c activated, the functional tab area displays an acquisition panel 350, an output panel 352 and a triggers panel 354. The acquisition panel 350 includes several boxes that allow a user to enter parameters related to acquisition of data that may be collected by the controller 154 and transmitted from the controller 154 to the computing device 108. In particular, a sample rate box 356 allows a user to enter a sample rate for collecting data by the controller 154, and a collection time box 358 allows a user to enter an amount of time for which the data should be collected. The output panel 352 allows a user to specify a format in which to output the data acquired from the controller 154. For example, the data acquired from the controller 154 is written to a data file and the data file is stored in a memory in the computing device 108. The user may be able to enter an output file name in a box 359 in the output panel 352 and/or may be able select a file name by using a browse button 361. The output panel 352 may also include a selectable menu, such as a drop down box 360, that allows a user to select a delimiter that separates data columns in the data file. In an embodiment, selectable delimiter options provided in the menu 360 include a "space" delimiter, a "comma" delimiter, and a "tab" delimiter. A comment block box 362 allows a user to enter a comment to be added to the data file. In an embodiment, the comment entered into the box 362 is added to a header of the data file.

Data acquisition may be initiated by a user by hitting a start button 364 provided in the tab 210c. In some embodiments, the tab 210c also allows a user to set up trigger events that will trigger data acquisition automatically. In particular, the trigger panel 354 may include several options for triggers that may be set up by a user for triggering the controller 154 to collect data and/or to transmit collected data to the computing device 108. Data acquisition trigger options may include, for example, an internal pressure trigger, feedback pressure trigger, detected error trigger, and digital input trigger, etc. For each of the available triggers, the trigger panel 354 allows a user to set up threshold values for triggering data acquisition from the controller 154. For example the user is able to enter a "less than" value and/or a "greater than" value to be used as threshold values corresponding for an available trigger. In an embodiment, the panel 354 may allow a user to specify only a less than or only a greater than threshold value for a trigger. For example, the panel 354 may allow the user to enter "disabled" for the other one of the less than threshold value or greater than threshold value for the trigger. In some embodiments, a threshold for a trigger may be specified in terms of a "low" or "high."

A user may individually select some or all of the triggers provided in the trigger panel 354. Indications of the selected trigger events and the specified threshold values for the triggers are transmitted to the controller 154. The controller 154 may be configured to receive indications of the selected trigger events or conditions and the specified threshold values for the trigger events or conditions, to monitor the system to detect the trigger events or conditions, and to automatically initiate data acquisition when the monitored trigger events or conditions are detected. For example, the controller 154 may include a data acquisition module, which may in the form of machine-readable instructions stored in a memory device of the controller 154 and executable by a processor of the controller 154. The data acquisition module may be configured to, when executed on the processor, cause the processor to perform trigger monitoring and data acquisition, for example according to data acquisition and triggering parameters specified by a user via the data tab 210c. For example, the data acquisition module may be configured to receive indications of one or more variables for which data is to be acquired by the controller 154. The data acquisition module may also be configured to receive indications of one or more trigger events to be used to trigger collection of the data by the controller 154. During operation, the data acquisition module may monitor the indicated trigger events by measuring, calculating or otherwise obtaining the parameter values (e.g., pressure, error, etc.) corresponding to the specified trigger events. The data acquisition mode may compare the obtained parameter values to the threshold value (or values) specified for the corresponding triggers. When the measured value is outside of the threshold value (or values) specified for the trigger, the module may initiate a data acquisition routine for collecting data for the one or more variables in the device 100. The one or more variables for which the data should be collected may be specified by a user via the plot screen variable controls 204 (FIG. 4). Additionally or alternatively, one or more default variables for which data is to be collected may be pre-programmed in the controller 154. In this case, the data acquisition module may not need to receive indications of these variables from the computer 108. In any event, data for the one or more variables may be collected by the controller 154 at the sample rate specified in the sample rate box 356 and for the amount of time specified in the collection time box 358. Upon completion of data collection, the controller 154 may cause the data to be transmitted to the computing device 108. The computing device 108 may store the data in a data file according to the format specified in the output panel 352. The stored data file may be retrieved by a user at a later time and may be viewed using an appropriate viewing application, or may be plotted in the plot are 202 (FIG. 4). Additionally or alternatively, the collected data may be stored in a memory of the controller 154 and may be available for subsequent retrieval by a computing device, such as the computing device 108.

Figure 9:
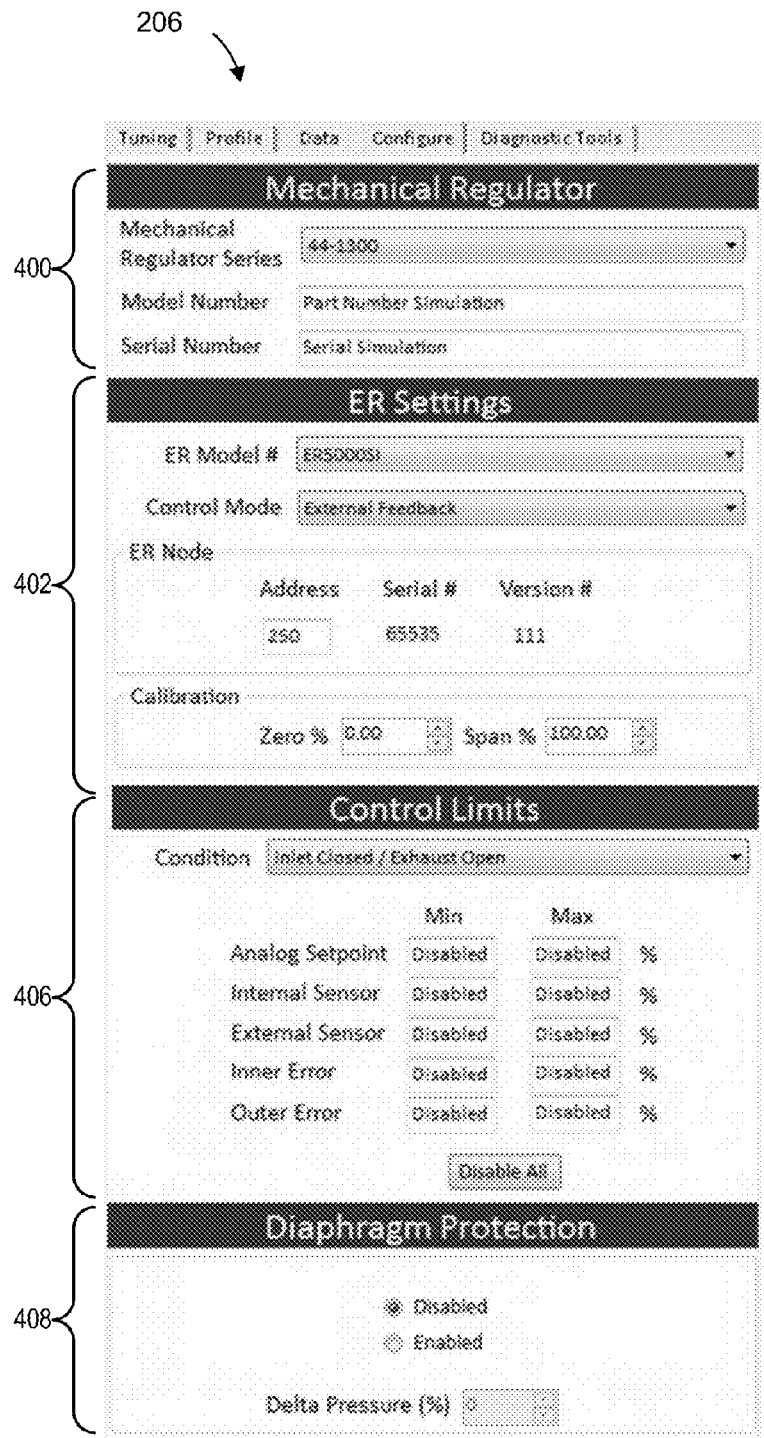
FIG. 9 is a detail view of a configuration portion of the example screen shot of FIG. 4.

FIG. 9 depicts a detail view of the functional tab area 206 (FIG. 4) with the configuration tab 210d selected. The configuration tab 210d includes a regulator panel 400 and a controller settings panel 402 that allow a user to enter information regarding the device 100, or to update information regarding the device 100 entered during set-up via the displays 170 (FIG. 3). Additionally, the configuration tab 201d includes a control limits panel 406 that allows a user to enter various control conditions that should be monitored by the controller 154. The control condition limits may include, for example, a maximum and/or a minimum value for the analog setpoint provided to the controller 154, a maximum and/or a minimum value for an internal sensor (e.g. pressure sensor, temperature sensor, etc.) of the controller 154, a maximum and/or a minimum value for a sensor (e.g. pressure sensor, temperature sensor, etc.) external to the controller 154, a maximum and/or a minimum value for an inner error detected by the controller 154, and/or a maximum and/or a minimum value for an outer error detected by the controller 154. The control limits panel 406 allows a user to enter a maximum and/or a minimum value for each control limit desired to be monitored by the controller 154, and allows the user to disable monitoring for the minimum and/or the maximum limit value for each of the condition limits. The control limits panel 406 also allows a user to select a control limit condition that the controller 154 will activate upon detection that a control limit is exceeded. The control limit conditions may include, for example, simultaneous closing of the inlet valve 136 and closing of the exhaust valve 138 in the pilot device 104. The control limit conditions may also include, for example, simultaneous closing of the inlet valve 136 and opening of the exhaust valve 138 in the pilot device 104. As another example, the control limit conditions may also include simultaneous closing of the inlet valve 136 and opening of the exhaust valve 138 in the pilot device 104.

A diaphragm protection panel 408 allows a user to enable or disable diaphragm protection in the device 100. When enabled, diaphragm protection feature may reduce the magnitude of any imbalance in pressure across the diaphragm 126 of the device 100, for example as a result of an abrupt termination of downstream demand. Further, diaphragm protection may improve start-up response times when downstream demand return after an abrupt termination, thereby protecting the diaphragm 126 and extending the life of the diaphragm 126.

Figure 10:
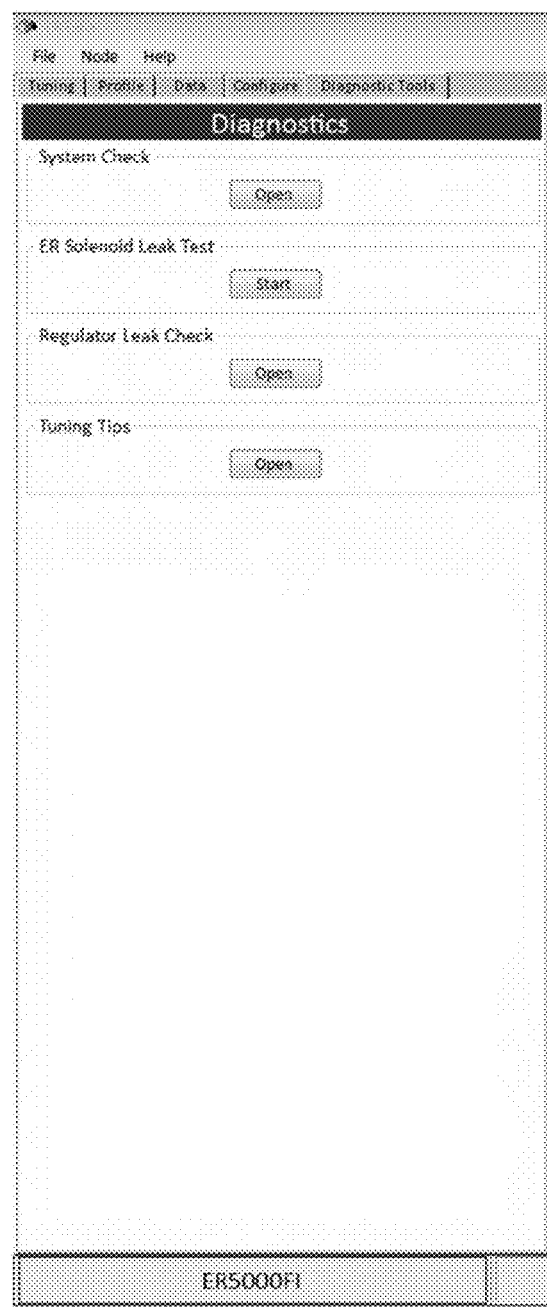
FIG. 10 is a detail view of a diagnostic tool portion of the example screen shot of FIG. 4.

FIG. 10 depicts a detail view of the functional tab area 206 (FIG. 4) with the diagnostic tools tab 210e selected. The diagnostic tools tab 210e facilitates diagnosing problems with the device 100. For example, the diagnostic tools tab 210e allows a user to run an automated test, such as a leak test. For example, a user may initiate an automated test by pressing a button provided in the diagnostic tab 210e. In some embodiments, the diagnostic tools tab 210e allows a user to retrieve a document or documents that list(s) various tips for diagnosing problems in the device 100. For example, a document listing various tips, illustrations, and the like for performing a system check or for performing a regulator leak test may be retrieved via the diagnostic tab 210e. Additionally, the diagnostic tools tab 210e may allow retrieval of a document or documents listing tips for controlling the device 100, such as tuning tips for tuning a PID controller in the device 100.

Figure 11:
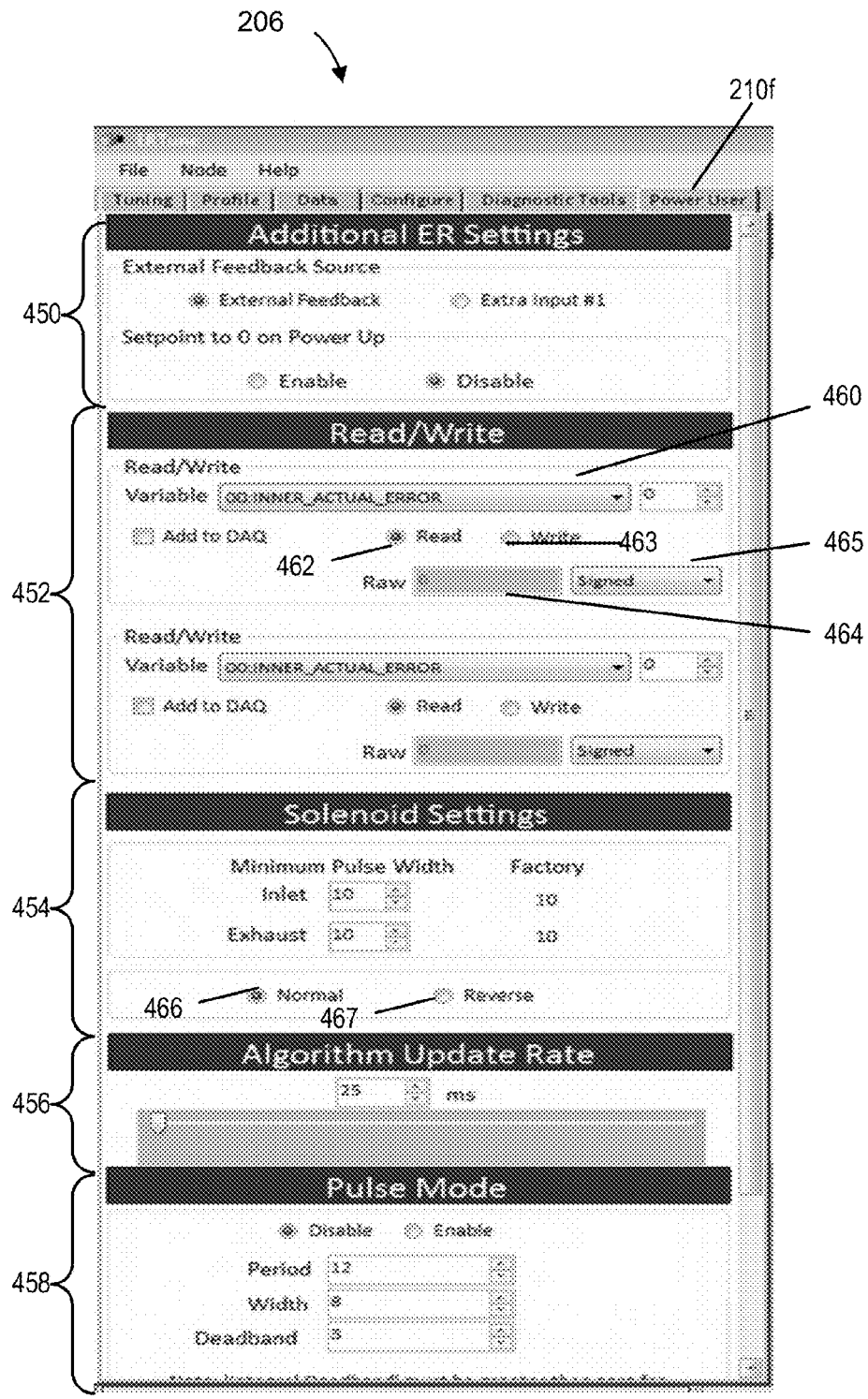
FIG. 11 is a detail view of a power user tab included in the display of FIG. 4 in some embodiments.

FIG. 11 depicts a detail view of a power user tab 210f included in the functional area 206 (FIG. 4) in some embodiments. In an embodiment, the power user tab 210f is not active by default in the display 200 and may be activated by accessing the help menu in the display 200. The power user tab 210f includes an additional settings panel 450, a read/write panel 452, a solenoid settings panel 454, and algorithm update rate panel 456, and a pulse mode panel 458. The additional settings panel 450 includes an external feedback source area that allows a user to select an external feedback source to be used as a feedback signal displayed in the plot area 202 (FIG. 4). Additionally, the additional setting panel includes a setpoint to zero (0) on power up area that allows a user to enable (or disable) a zero setpoint power up mode. When the zero setpoint power up mode is enabled, the regulator 154 is programmed to power up with the setpoint initially set to a value of zero. When the zero setpoint power up mode is disabled, the regulator 154 powers up with the setpoint initially set to the value at which the regulator 154 was last powered down (the value at which the regulator 154 was last powered down may be stored in a memory in the regulator 154, for example).

The read/write panel 452 allows a user to view and/or modify various internal variables of the regulator 154. Variables available for view and/or modification via the power user tab 210f may be provided to the user via a selectable menu, such as a drop box menu 460. The read/write panel 452 includes a read radio button 462 and a write radio button 463 for selecting whether viewing or modification of a variable, respectively, is desired. When the write radio button 463 is activated, the user can enter a value for the variable into a box 464 and can also specify whether the entered value is signed or unsigned via a selectable menu 465. A user is able to add a variable to the set of variables for which data is acquired from the regulator 154 or remove a variable the set of variables for which data is acquired from the regulator 154, respectively.

The solenoid settings panel 454 allows a user to set a minimum value for the pulse width modulator for the inlet valve 136 and the outlet valve 138 of the pilot device 104. Increasing the minimum value increases the pulse width of the output sent to the corresponding valve 136, 138 by the controller 154, resulting in a lower threshold of activation when an error is generated by the controller 154, in an embodiment. The solenoid settings panel 454 may also allow a user to reverse the normal response of the regulator 154 via radio buttons 466, 467. When the reverse radio button 467 is activated, opening and closing operations of the inlet valve 136 and the exhaust valve 138 are reversed compared to normal operation described above. Reverse operation may be selected to configure the controller 154 for use in applications in which increasing flow reduces feedback (e.g., temperature), such as when cooling error is regulated for temperature, for example.

The algorithm update panel 456 allows a user to set the rate at which the regulator 154 operates. For example, the rate at which feedback is sensed and a response to feedback is generated by the controller 154 may be adjusted via the algorithm update panel 456. The pulse mode panel 456 allows a user to configure the regulator 154 to operate in a pulse mode in response to errors detected in the deadband region specified on the tuning tab 210a discussed above in connection with FIG. 6A. In particular, enabling the pulse mode configures the controller 154 to respond to an error detected within the deadband range with a short, pulsed, activation of the solenoid valve 136, 138. The pulse mode panel 456 further allows a user to set various parameters, such as a "period" parameter to specify the number of times the regulator 154 cycles through the algorithm update prior to initiating the pulsing action, a "width" parameter to specify or how long the solenoid valve 136, 138 remains open during a pulse) and a "deadband" parameter to specify a range in which pulsing is not activated.

Figure 12:
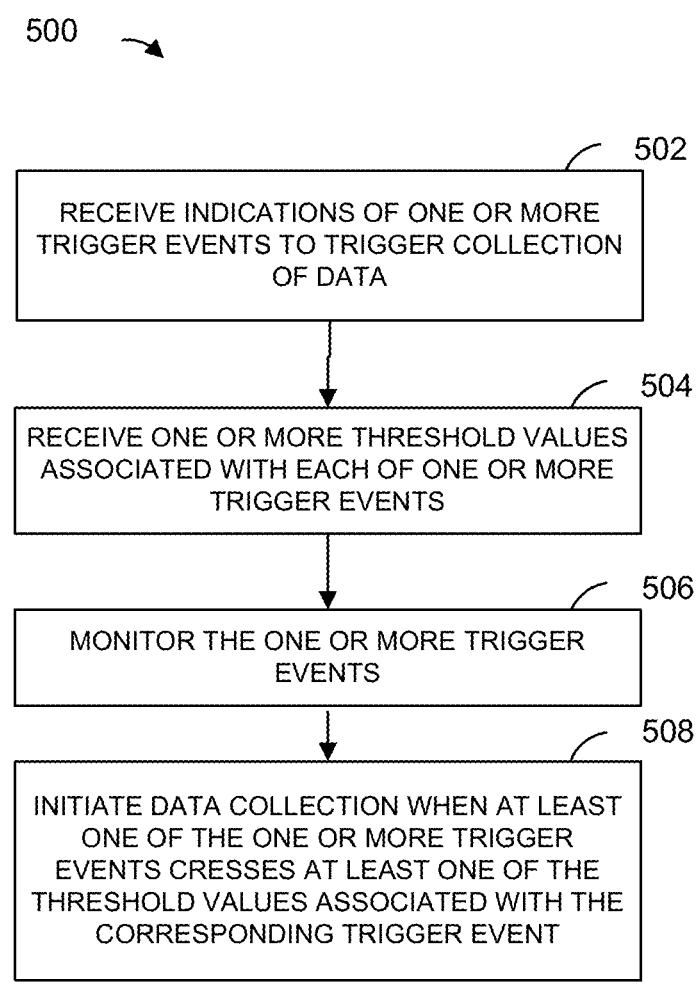
FIG. 12 is a flow chart of a method for collecting data in a field device, according to an embodiment of the present disclosure.

A flow diagram in FIG. 12 depicts a method 500 for acquiring data from a pressure regulating device operating in a process control system. The method 500 is a computer-implemented method implemented by software instructions stored on a computer-readable medium (excluding transitory signals) and executed by a processor of, for example, the electronic controller 154. The processor receives an indication of one or more trigger events to trigger collection of data (block 502). The processor also receives one or more threshold values associated with each of the one or more trigger events (block 504). During operation of the electronic controller 154, the processor monitors the one or more trigger events (block 506). For example, the processor receives measurements of one or more variable associated with the trigger events and compares the received measurements with the threshold values associated with the trigger events. When at least one of the trigger events variable associated with the one or more trigger events crosses the one or more threshold values received for the corresponding trigger event, the processor initiates data collection (block 508).

Figure 13:
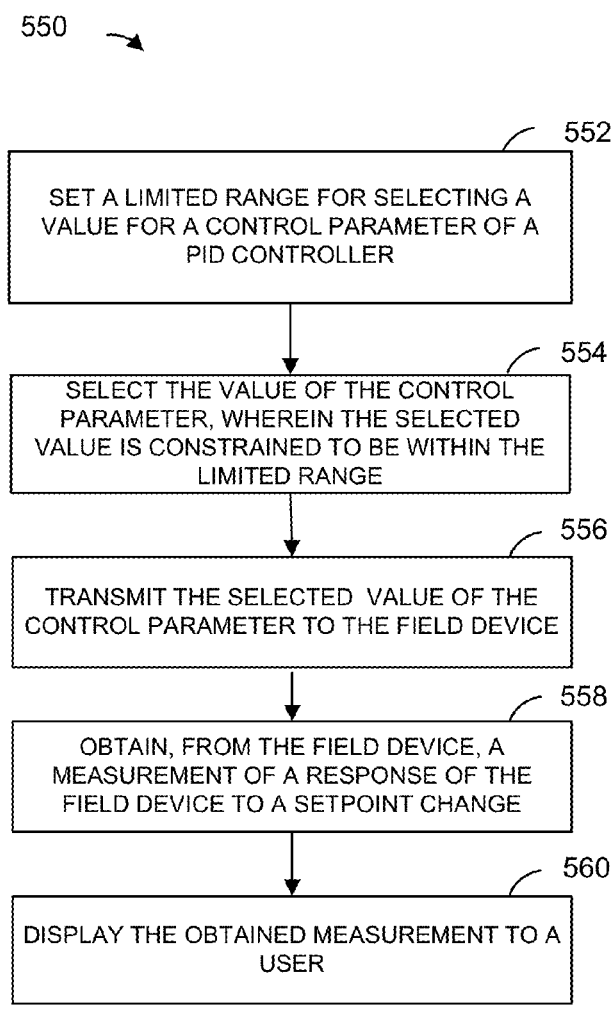
FIG. 13 is a flow chart of a method for tuning a PID controller in a field device, according to an embodiment of the present disclosure.

A flow diagram in FIG. 13 depicts a method 550 for tuning a PID controller in a field device. The method 500 is a computer-implemented method implemented by software instructions stored on a computer-readable medium (excluding transitory signals) and executed by a processor of, for example, the computing device 108. A limited range for selecting a value for a control parameter is provided (block 552). The value of the control parameter is selected, wherein selection of the value is constrained to be within the limited range (block 554). The selected value of the control parameter is transmitted to the field device (block 556), and a measurement of a field device response in response to a setpoint change is obtained from the field device (block 558). Then, the obtained measurement is displayed to a user (block 560).

It is noted that in embodiments, some of the steps recited above in connection with the method 500 (FIG. 12) and/or the method 550 (FIG. 13) are omitted, combined, supplemented, or reordered.

Unless specifically stated otherwise, discussions herein using words such as "processing," "computing," "calculating," "determining," "identifying," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

When implemented in software, any of the applications, services, engines, routines, and modules described herein may be stored in any tangible, non-transitory computer readable memory such as on a magnetic disk, a laser disk, solid state memory device, molecular memory storage device, an optical disk, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A process control system comprising:
   a regulator body having an inlet, an outlet, a control element, and a diaphragm assembly operably coupled to the control element for moving the control element in response to pressure changes across the diaphragm to control the flow of fluid from the inlet to the outlet;
   a pilot device coupled to the regulator body for loading a top surface of the diaphragm, the pilot device comprising an inlet port adapted to receive a supply of loading gas and having an inlet valve, an exhaust port having an exhaust valve, an outlet port in fluid communication with the top surface of the diaphragm of the regulator, a loading pressure sensor disposed between the inlet valve and the exhaust valve and in fluid communication with the outlet port and the top surface of the diaphragm, and an onboard controller communicatively coupled to the inlet valve, the exhaust valve, and the loading pressure sensor, the inlet valve operable between an open position to open the inlet port for delivering the supply of loading gas to the outlet port and the top surface of the diaphragm and a closed position to close the inlet port, and the exhaust valve operable between an open position to open the exhaust port and exhaust gas away from the top surface of the diaphragm and a closed position to close the exhaust port;
   a feedback pressure sensor connected between the outlet of the regulator and the on-board controller of the pilot device, the feedback pressure sensor adapted to periodically sense a pressure at the outlet of the regulator body and send a feedback control signal to the pilot device controller, the feedback control signal indicative of the magnitude of the detected pressure;
   the exhaust valve coupled at an input of the exhaust valve to the outlet port and at an output of the exhaust valve to the exhaust port; and
   the on-board controller operable to actuate the inlet valve and the exhaust valve to adjust the controlled pressure delivered to the outlet port, the controller comprising a processor, a computer readable memory having computer readable instructions executable on the processor, and a data collection module stored in the memory, the data collection module, when executed on the processor, configured to:
   receive indications of one or more variables for which data should be collected,
   receive indications of one or more trigger events to trigger data collection, wherein each of the one or more trigger events is associated with a respective variable,
   receive one or more threshold values associated with each of the one or more trigger events,
   monitor the one or more trigger events, and
   initiate data collection when at least one of the one or more trigger events crosses one or more of the threshold values associated with the corresponding trigger event.

2. The process control system according to claim 1, wherein the one or more threshold values associated with each trigger event of the one or more trigger events includes one or both of a maximum threshold value and a minimum threshold value.

3. The process control system according to claim 1, wherein monitoring the one or trigger events includes:
   measuring a parameter corresponding to a trigger event of the one or more trigger events to obtain a measured value of the parameter associated with the trigger event, and
   comparing the measured value each of the one or both of the maximum threshold value and the minimum threshold value associated with the trigger event to determine whether the measured value is greater than the maximum threshold value or less than the minimum threshold value.

4. The process control system according to claim 1, wherein the data collection module, when executed on the processor, is further configured to
   receive an indication of a sample rate for data collection,
   receive an indication of a duration of time during which data is to be collected, and
   upon initiating data collection, collect the data at the sample rate indicated by the sample rate and for a time duration of time indicated by the collection time.

5. The process control system according to claim 1, wherein the data collection module, when executed on the processor, is further configured to, upon completion of the data collection, cause the data to be transmitted to a computing device.

6. The process control system according to claim 1, wherein the data collection module, when executed on the processor, is further configured to cause the data to be stored in a memory of the controller.

7. The process control system according to claim 1, wherein the data is stored in the memory according to a user-specified data file format.

8. A method for collecting data in a pressure regulating field device operating in a process control system including a regulator body with an inlet, an outlet, a control element, and a diaphragm assembly operably coupled to the control element for moving the control element in response to pressure changes across the diaphragm to control the flow of fluid from the inlet to the outlet, the process control system including a pilot device coupled to the regulator body for loading a top surface of the diaphragm and including an inlet port adapted to receive a supply of loading gas and having an inlet valve, an exhaust port having an exhaust valve, an outlet port in fluid communication with the top surface of the diaphragm of the regulator, a loading pressure sensor disposed between the inlet valve and the exhaust valve and in fluid communication with the outlet port and the top surface of the diaphragm, and an onboard controller communicatively coupled to the inlet valve, the exhaust valve, and the loading pressure sensor, the inlet valve operable between an open position to open the inlet port for delivering the supply of loading gas to the outlet port and the top surface of the diaphragm and a closed position to close the inlet port, and the exhaust valve operable between an open position to open the exhaust port and exhaust gas away from the top surface of the diaphragm and a closed position to close the exhaust port; the method comprising receiving, at a processor, indications of one or more variables for which data should be collected;
receiving, at a processor, indications of one or more trigger events to trigger collection of data;
receiving, at a processor, one or more threshold values associated with each of the one or more trigger events;
monitoring, by a processor, the one or more trigger events; and
initiating, by a processor, data collection when at least one of the one or more trigger events crosses one or more of the threshold values associated with the corresponding trigger event.

9. A method according to claim 8, wherein the one or more threshold values for a trigger event includes one or both of a maximum threshold value and a minimum threshold value for the trigger event.

10. A method according to claim 8, wherein monitoring the one or trigger events comprises:
measuring a specified variable associated with the trigger event to obtained a measured value, and
comparing the measured value to the one or more threshold values for the corresponding trigger event to determine whether the measured value is outside of a range defined by the one or more threshold values.

11. A method according to claim 8, further comprising:
receiving an indication of a sample rate for data collection and an indication of a collection time for the data collection, and
upon initiating the data collection, collecting the data at a rate indicated by the sample rate and for a time duration indicated by the collection time.

12. A method according to claim 8, further comprising, upon completion of the data collection, causing transmitting the data to a computing device communicatively coupled to the pressure regulating device.

13. A method according to claim 8, further comprising receiving the data by the computing device and storing the received data in a data file in a memory of the computing device.

14. A method according to claim 13, wherein the data is stored in the data file according to a user-specified data file format.

* * * * *